United States Patent [19]

Seidel

[11] 4,078,679
[45] Mar. 14, 1978

[54] METERING FLOW DEVICE FOR LOADING AND CONVEYING MACHINES

[75] Inventor: Richard E. Seidel, Little Chute, Wis.

[73] Assignee: Northwest Engineering Company, Green Bay, Wis.

[21] Appl. No.: 763,526

[22] Filed: Jan. 28, 1977

[51] Int. Cl.² .............................................. B65G 47/16
[52] U.S. Cl. .............................. 214/90 R; 214/146 R
[58] Field of Search ................. 214/90 R, 90 A, 91 R, 214/146 R, 767

[56] References Cited

U.S. PATENT DOCUMENTS

| 1,508,857 | 9/1924 | Pratt | 214/90 R |
|---|---|---|---|
| 2,714,459 | 8/1955 | Hay | 214/90 R |

Primary Examiner—Robert G. Sheridan
Attorney, Agent, or Firm—Andrus, Sceales, Starke & Sawall

[57] ABSTRACT

A material loading and conveying machine has an opennended scoop for gathering and containing loose material, and a conveyor for receiving material from the scoop. The open rear end of the scoop abuts a curved backstop plate having a center of curvature on the axis about which the scoop is raised or lowered. In addition, the lower portion of the backstop plate is fixed to the machine, while the upper backstop portion normally abuts the lower portion but is selectively raisable to form a gate which meters the flow of gathered material from the open rear end of the raised scoop onto the conveyor.

8 Claims, 4 Drawing Figures

METERING FLOW DEVICE FOR LOADING AND CONVEYING MACHINES

PRIOR ART OF INTEREST

Keast U.S. Pat. No. 1,260,683 filed on 3-26-18
Hay U.S. Pat. No. 2,714,459 filed on 8-2-55
Biedes U.S. Pat. No. 3,096,893 filed on 7-9-63
Allard U.S. Pat. No. 3,127,038 filed on 3-31-64
Cunningham U.S. Pat. No. 3,547,287 filed on 12-15-70

BACKGROUND AND SUMMARY OF THE INVENTION

This invention relates to a metering flow device for loading and conveying machines.

Broadly, such machines utilize a front end implement to gather rock, sand, ore or other loose material and transfer it to a self-contained conveyor for transport to a discharge location, usually disposed at the rear of the machine. These machines are often vehicular in nature and find extensive use above ground and also in tunneling.

In some instances, it has been found desirable to use a front end implement which is scoop-shaped. Such an implement is forced horizontally into the loose material to thereby gather a quantity thereof, and is then raised to above the front end of the conveyor where it dumps the material onto the conveyor.

It has been found that if the scoop has too large a capacity in relation to the conveyor, the act of dumping the entire scoop contents at one time can overload the conveyor, causing jamming or damage. In addition, if the pile of loose material being gathered is relatively low, it may be difficult to fill the scoop to capacity for dumping.

The present invention is based on a unique solution to the above-mentioned difficulties.

In accordance with one aspect of the invention, the scoop is open-ended; that is, it is open at both its front and rear. Furthermore, the open rear end of the scoop abuts a curved backstop plate having a center of curvature on the axis about which the scoop is raised or lowered. In addition, the lower portion of the backstop plate is fixed to the machine, while the upper backstop portion normally abuts the lower portion but is selectively raisable to form a gate which meters the flow of gathered material from the open rear end of the raised scoop onto the conveyor.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
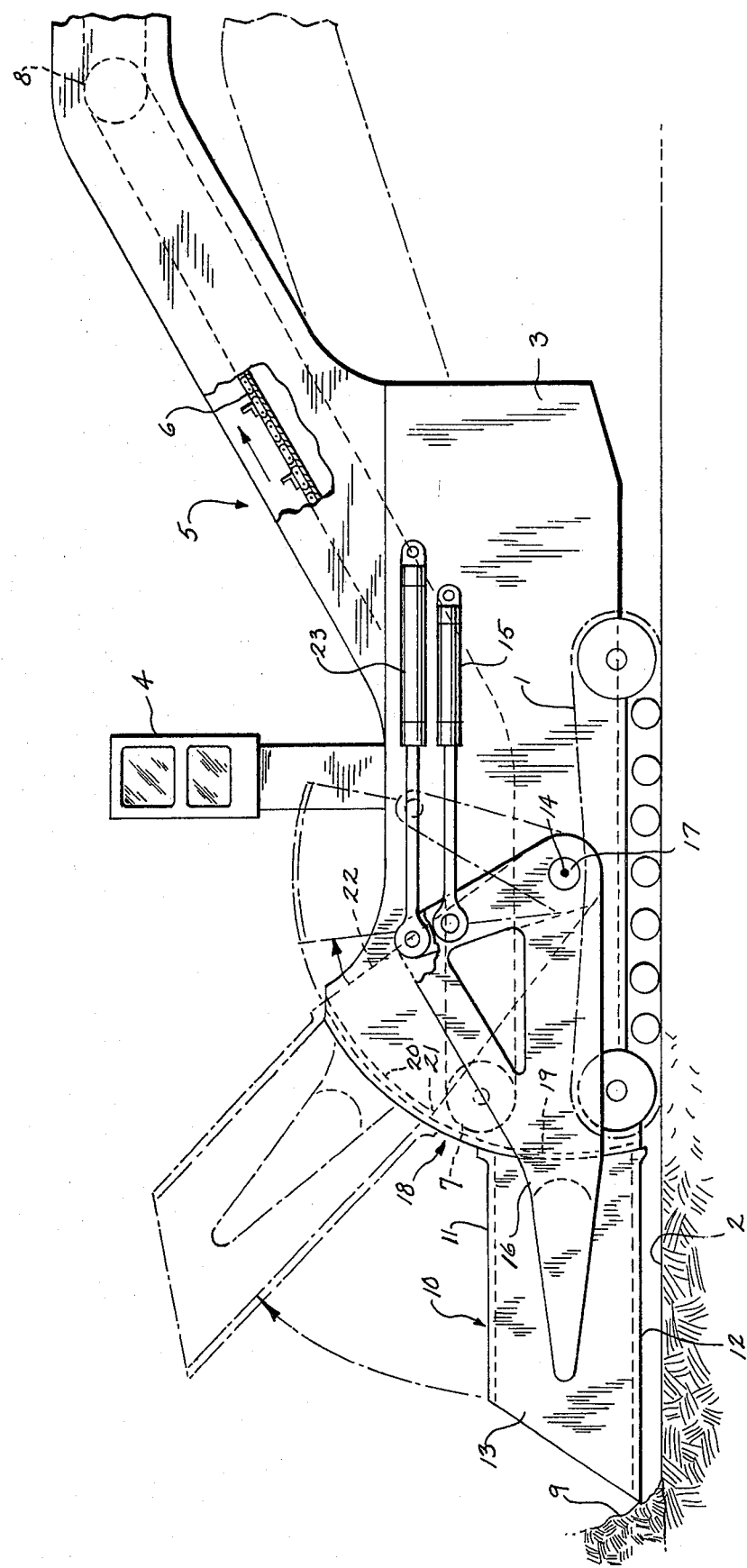
FIG. 1 is a fragmentary schematic side elevation of a loading and conveying machine which incorporates the concept of the invention, and showing two positions of the material gathering implement.

As shown in FIG. 1, the invention is embodied in a material loading and conveying mechanism having vehicle transport means such as crawler treads 1 which support the machine on the ground 2 and are driven by any suitable means, not shown, to move the machine during loading operations and for travel between operating sites. The machine includes a frame 3 which in turn supports an operator's cab 4.

An elongated conveyor assembly 5 is mounted to frame 3 and in this instance extends from the front portion of the frame and upwardly to the rear. Assembly 5 includes an endless conveyor belt 6 which is trained about front and intermediate sprockets 7, 8, and a rear drive sprocket of the usual well-known type, not shown.

A front-end implement is provided for gathering and containing loose material 9 on the ground. In this instance, the implement comprises a scoop 10 which may be rectangular in configuration and having a top wall 11, a bottom wall 12, and side walls 13 joining walls 11 and 12. Both the front and rear ends of scoop 10 are open.

Scoop 10 is normally positioned close to ground 2 for loading of material, but is adapted to be pivotally raised about a horizontal transverse axis 14 for transfer of material to the front portion of conveyor belt 6. For this purpose, a scoop lift cylinder 15 is mounted between frame 3 and a rearwardly extending generally triangular bracket 16, with the latter being attached to the side walls of scoop 10 and mounted on a shaft 17 for pivotal movement about axis 14.

In accordance with the invention, means are provided to selectively meter the flow of material 9 from the open rear end of the raised scoop 10 onto conveyor belt 6. Supplementally, a portion of the metering means also closes the open rear end of scoop 10 when the latter is in lowered position and also selectively blocks the open rear end of scoop 10 in all positions when desired and as will be described hereinafter.

For this purpose, a curved backstop 18 is mounted at the front end of frame 3, directly behind and closely adjacent scoop 10. Backstop 18 is convex from the front, extends across the width of the machine, and extends from near the ground upwardly and rearwardly to over the front portion of conveyor belt 6. The backstop curvature is on a radius emanating from axis 14.

Backstop 18 forms a selectively operable gate to control the flow of material 9 onto belt 6. For this purpose, backstop 18 comprises a lower curved plate 19 which is fixedly mounted to frame 3, and an upper curved plate 20 which normally abuts the top edge of plate 19 at 21 and forms an extension of plate 19. Upper plate 20 is connected by brackets 22 to shaft 17 and is pivotable about axis 14, as by a gate cylinder 23 connected between frame 3 and the brackets.

Cylinders 15 and 23 are selectively controlled from the operator's cab 4 in the usual well-known manner.

Figure 2:
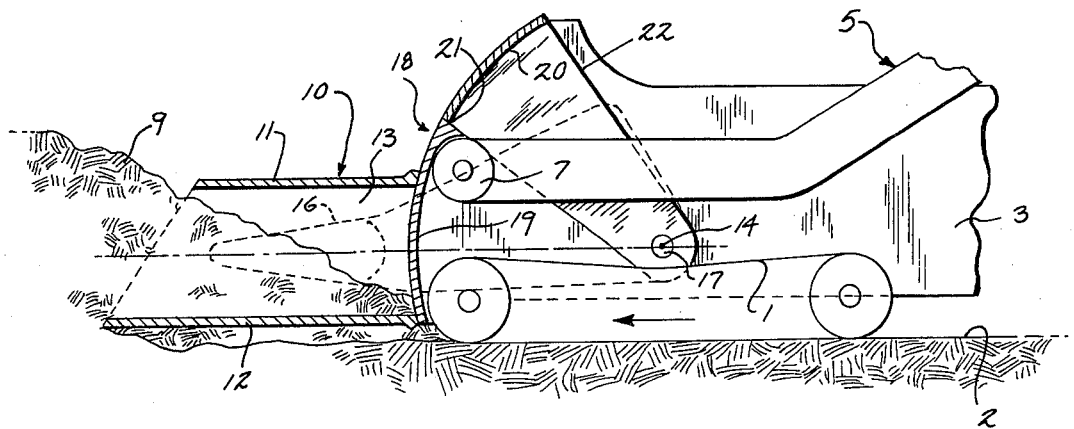
FIG. 2 is a fragmentary schematic longitudinal section showing the implement lowered and gate closed.

Operation of the device will now be described. Referring first to FIG. 2, scoop 10 is shown in its lowered working position and the gate is closed with upper plate 20 abutting lower plate 19. As the machine is driven forward, scoop 10 digs into the mass of loose material 9. The open rear end of scoop 10, which conforms to the curvature of backstop 18, is closed or blocked by fixed lower plate 19 so that material 9 cannot pass rearwardly out of the scoop.

Figure 3:
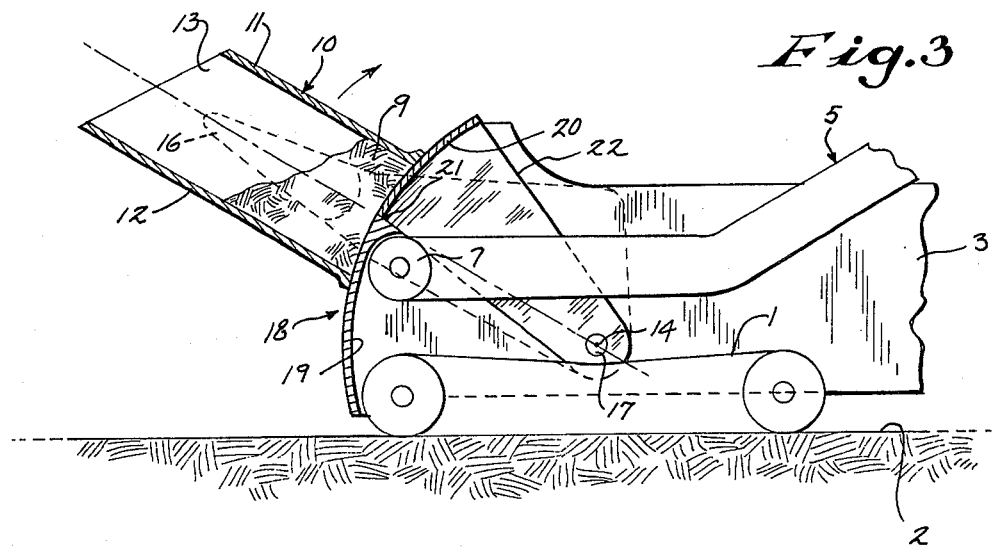
FIG. 3 is a view similar to FIG. 2 and showing the implement raised with the gate still closed.

Referring to FIG. 3, scoop 10 is then raised, pivoting about axis 14 and following along the curvature of backstop 18. In the partially raised position of FIG. 3, scoop 10 overlaps both plates 19 and 20 so that both plates block material 9 and retain it in the scoop chamber.

Figure 4:
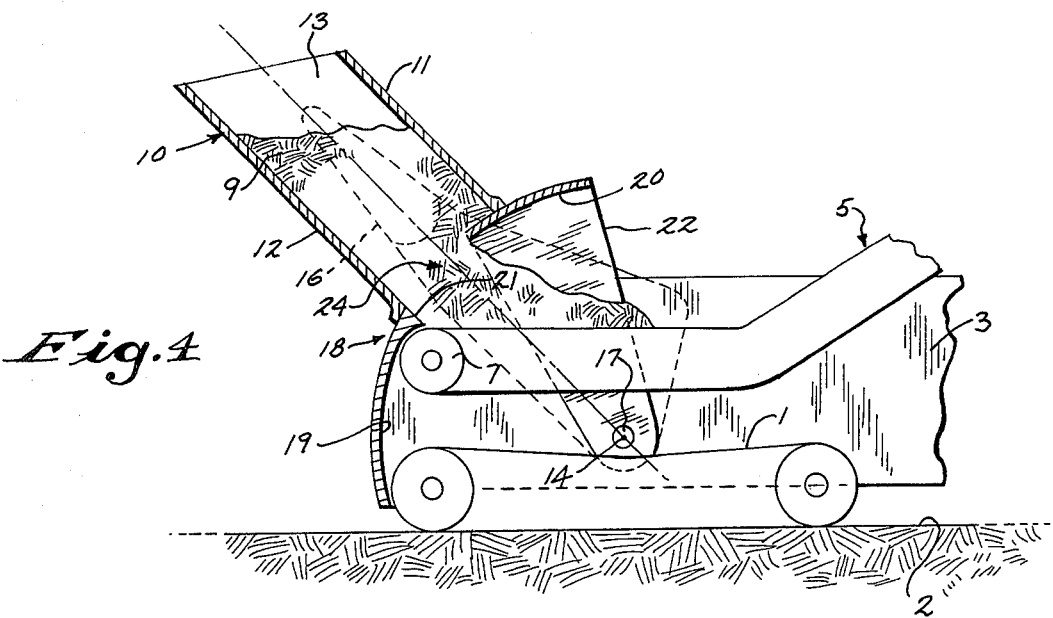
FIG. 4 is a view similar to FIGS. 2 and 3 and showing the implement raised and the metering gate in open metering position.

When scoop 10 is raised to its uppermost position as shown in FIG. 4, the gate may be opened by pivoting plate 20 upwardly, to thereby form a restrictive metering opening 24 which permits material 9 to flow downwardly through the open rear end of scoop 10 and onto belt 6. In FIG. 4, the gate is only partially open. The selective size of metering opening 24 may be varied at will by the operator by proper control of gate cylinder 23.

In some instances, as when a pile of loose material 9 on the ground is very low, it may not be possible to completely fill scoop 10 merely by moving the machine forwardly. This problem can be overcome with the construction of the invention. When scoop 10 is only partially filled, it can be raised to shift its contents rearwardly and then lowered to take another charge, all with the gate closed. This may be done several times until scoop 10 is as full as desired, and then the scoop raised and the gate opened to discharge the material onto the conveyor.

Various modes of carrying out the invention are contemplated as being within the scope of the following claims particularly pointing out and distinctly claiming the subject matter which is regarded as the invention.

I claim:

1. In a machine for loading and conveying loose material such as sand and the like:
   (a) transport means for supporting and moving the machine on the ground,
   (b) a conveyor mounted on said machine and having a portion disposed adjacent the front of the machine,
   (c) material gathering means mounted to the front of the machine and with said gathering means being pivotable about an axis between a lowered working position and a raised position for discharge of material onto said conveyor,
   (d) and selectively controllable metering means having a portion pivotable about said axis and with said metering means disposed between said material gathering means and said conveyor to thereby limit the discharge of material onto said conveyor.

2. The machine of claim 1 in which said material gathering means comprises a scoop having open front and rear ends, the said rear end being disposed closely adjacent said metering means which forms a gate for passage of material.

3. The machine of claim 2 in which said metering means comprises:
   (a) a curved backstop member disposed behind said scoop,
   (b) said backstop member having a fixed lower portion and an upper portion selectively pivotable about said axis between lower and upper positions to form a restrictive metering opening.

4. The machine of claim 3 in which said lower portion of said backstop member forms means to block flow of loose material from the rear end of said scoop when the latter is in its said lowered position.

5. The machine of claim 4 in which the said upper portion of said backstop member extends rearwardly over said conveyor.

6. The machine of claim 5 in which the curvature of said backstop member is on a radius emanating from said axis.

7. The machine of claim 3 in which said upper backstop portion abuts said lower portion when the upper portion is in its lowermost position.

8. The machine of claim 7 in which both said backstop portions form means to block flow of loose material from the rear end of said scoop when said upper portion is in its lowermost position.

* * * * *

UNITED STATES PATENT AND TRADEMARK OFFICE
CERTIFICATE OF CORRECTION

PATENT NO. : 4,078,679
DATED : March 14, 1978
INVENTOR(S) : Richard E. Seidel

It is certified that error appears in the above-identified patent and that said Letters Patent are hereby corrected as shown below:

Column 1, In each of Lines 5,6,7,8,9, - Delete the word "filed" and substitute therefor ---issued---

Signed and Sealed this

Fourth Day of July 1978

[SEAL]

Attest:

RUTH C. MASON
*Attesting Officer*

DONALD W. BANNER
*Commissioner of Patents and Trademarks*